United States Patent
Ogasawara

(10) Patent No.: US 8,964,204 B2
(45) Date of Patent: Feb. 24, 2015

(54) IMAGE PROCESSING APPARATUS HAVING SECURE PRINT FUNCTION, CONTROL METHOD THEREFOR, AND STORAGE MEDIUM

(75) Inventor: Taku Ogasawara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 79 days.

(21) Appl. No.: 13/616,060

(22) Filed: Sep. 14, 2012

(65) Prior Publication Data
US 2013/0100478 A1 Apr. 25, 2013

(30) Foreign Application Priority Data

Oct. 20, 2011 (JP) ................................ 2011-230597

(51) Int. Cl.
G06K 15/00 (2006.01)
G06K 15/02 (2006.01)
G06F 3/12 (2006.01)

(52) U.S. Cl.
CPC ........ G06K 15/4095 (2013.01); G06K 15/1856 (2013.01); G06F 3/122 (2013.01); G06F 3/1222 (2013.01); G06F 3/1238 (2013.01); G06F 3/1247 (2013.01); G06F 3/1267 (2013.01); G06F 3/1279 (2013.01); G06F 3/1213 (2013.01); G06F 2206/1514 (2013.01)
USPC ........ 358/1.14; 358/1.15; 358/1.16; 358/1.17

(58) Field of Classification Search
USPC ....................................................... 358/1.14
See application file for complete search history.

(56) References Cited

U.S. PATENT DOCUMENTS

| | | | |
|---|---|---|---|
| 2002/0186421 A1* | 12/2002 | Tachibana | 358/437 |
| 2005/0174598 A1* | 8/2005 | Sakiyama et al. | 358/1.15 |
| 2007/0127053 A1* | 6/2007 | Tominaga | 358/1.14 |
| 2010/0134822 A1* | 6/2010 | Kimura et al. | 358/1.14 |
| 2011/0161794 A1* | 6/2011 | Shiohara | 715/209 |
| 2011/0255112 A1* | 10/2011 | Martin et al. | 358/1.13 |
| 2012/0127495 A1* | 5/2012 | Tominaga | 358/1.9 |
| 2012/0250066 A1* | 10/2012 | Kikumoto et al. | 358/1.14 |

FOREIGN PATENT DOCUMENTS

JP 2006-293933 A 10/2006

* cited by examiner

*Primary Examiner* — Benjamin O Dulaney
(74) *Attorney, Agent, or Firm* — Rossi, Kimms & McDowell LLP

(57) ABSTRACT

An image processing apparatus which is capable of solving a problem that printing cannot be performed due to a shortage of a storage area for image data after rendering of a secure print job, and reducing a wait time from authentication to start of printing. A first storage unit performs rendering on a received secure print job, and stores image data in a storage area. A first transition unit makes the secure print job transit to waiting-for-authentication state. A first suspending unit suspends rendering when a stored image data amount reaches a full capacity during rendering in the waiting-for-authentication state. A second transition unit makes the secure print job transit to a successfully-authenticated state. A second storage unit performs printing on the stored image data, erases the printed image data, starts rendering on a subsequent page, and stores image data obtained by converting the subsequent page.

12 Claims, 7 Drawing Sheets

IMAGE PROCESSING APPARATUS HAVING SECURE PRINT FUNCTION, CONTROL METHOD THEREFOR, AND STORAGE MEDIUM

BACKGROUND OF THE INVENTION

1. Field of the Invention

The present invention relates to an image processing apparatus, a control method therefor, and a computer-readable storage medium storing a program for implementing the method, and in particular to a secure print technique of the image processing apparatus.

2. Description of the Related Art

Conventionally, a secure print function of an image forming apparatus is to maintain confidentiality by preventing a third party from seeing printed matter input to an image processing apparatus from an information processing apparatus connected to a LAN.

A brief explanation of the secure print function will now be given in terms of user's perspective.

A user inputs a print job with a password added thereto from an information processing apparatus to an image processing apparatus via a LAN. After inputting the job, the user moves to the image processing apparatus and enters a password through an operation unit of the image processing apparatus. After authentication is completed, printing is started, and as a result, the user can properly obtain a printing result. For example, according to Japanese Laid-Open Patent Publication (Kokai) No. 2006-293933, internal processing by an image processing apparatus temporarily accumulates image data, which is generated by carrying out PDL interpretation and rendering on a received print job, in a storage device such as an HDD. After a rendering process for all pages of input data is completed, the image processing apparatus brings the job into a state of waiting for authentication. The image processing apparatus accepts an input of a password via the operation unit, and after authentication, starts a printing process on the image data accumulated in the storage device.

In recent years, there have been inexpensive image processing apparatuses having only low-capacity storage devices, and there has been a great demand for equipping these image processing apparatuses as well with the secure print function.

However, the conventional methods are based on the assumption that an image processing apparatus has a high-capacity storage device such as an HDD, and when they are applied to an image processing apparatus having a low-capacity storage device, problems will arise.

Also, according to prior arts relating to problems involved in low-capacity secure print, other problems will arise.

A description will now be given of the conventional methods and the problems involved in low-capacity secure print.

First, a description will be given of a problem that will arise when the conventional methods are applied to an image processing apparatus having only a low-capacity storage device. The problem that will arise in this case is that in the image processing apparatus, there is a shortage of storage areas for image data that has been subjected to rendering, and there are jobs that cannot be printed. The amount of image data after rendering of a print job cannot be known until rendering is performed. For this reason, when the capacity becomes full after processing of a job is started, the image processing apparatus conventionally cancels the job for the purpose of protection. The problem of the capacity becoming full hardly arises on practical side in an image processing apparatus having a high-capacity storage device such as an HDD, but frequently arises in a low-capacity image processing apparatus that has no HDD or the like.

Next, a description will be given of problems involved in small-capacity secure print according the prior arts. Examples of the prior arts relating to problems involved in small-capacity secure print include Japanese Laid-Open Patent Publication (Kokai) No. 2006-293933. According to the prior arts, a job ticket including a password is used before a print job is received. An image processing apparatus receives a job ticket including a password from a host, and after performing authentication using the job ticket, starts receiving a print job as a main part of the job and carries out a rendering process and a printing process, thus realizing low-capacity secure print.

However, in this method according to the prior arts, because after authentication, an image processing apparatus receives a job and carries out all subsequent processes, there may be cases where a user has to wait from authentication to start of printing. For example, in the case of a job for which a fallback or the like occurs during rendering in an image processing apparatus, a user may have to wait for several minutes. In such a case, although the user is executing secure print for originals desired to be maintained confidential, an undesirable situation may occur in which printing is not started immediately after the user instructs authentication via an operation unit of the image processing apparatus. It should be noted that there is no such wait time according to a secure print method for conventional models having HDDs, because after completion of a rendering process on all pages of a print job, authentication is performed, and printing is started.

SUMMARY OF THE INVENTION

The present invention provides an image processing apparatus and a control method therefor which are capable of solving a problem that printing cannot be performed due to a shortage of a storage area for image data after rendering of a secure print job, and reducing a wait time from authentication to start of printing, as well as a computer-readable storage medium storing a program for implementing the method.

Accordingly, a first aspect of the present invention provides an image processing apparatus that receives a secure print job and carries out a printing process, comprising, a first storage unit configured to carry out a rendering process on the received secure print job, and store image data in a storage area, a first transition unit configured to cause the secure print job to make a transition to a state of waiting for authentication in which it is possible to accept an authenticating instruction from a user, a first suspending unit configured to suspend the rendering process when an amount of image data stored in the storage area reaches a full capacity of the storage device during the rendering process in the state of waiting for authentication, a second transition unit configured to, when an authenticating instruction from the user is accepted after the rendering process is suspended, and the authentication is successful, cause the secure print job to make a transition to a successfully-authenticated state, and a second storage unit configured to carry out a printing process on the image data stored in the storage area, erase the image data for which the printing process has been completed from the storage area, start a rendering process on a subsequent page, and store, in the storage area, image data obtained by converting the subsequent page.

Accordingly, a second aspect of the present invention provides a control method for an image processing apparatus that receives a secure print job and carries out a printing process, comprising a first storage step of carrying out a rendering process on the received secure print job, and storing image data in a storage area on a storage device, a first transition step of causing the secure print job to make a transition to a state of waiting for authentication in which it is possible to accept an authenticating instruction from a user, a first suspending step of suspending the rendering process when an amount of image data stored in the storage area reaches a full capacity of the storage device during the rendering process in the state of waiting for authentication, a second transition step of, when an authenticating instruction from the user is accepted after the rendering process is suspended, and the authentication is successful, causing the secure print job to make a transition to a successfully-authenticated state, and a second storage step of carrying out a printing process on the image data stored in the storage area, erasing the image data for which the printing process has been completed from the storage area, starting a rendering process on a subsequent page, and storing, in the storage area, image data obtained by converting the subsequent page.

Accordingly, a third aspect of the present invention provides a non-transitory computer-readable storage medium storing a program for implementing a control method of controlling an image processing apparatus that receives a secure print job and carries out a printing process, the control method comprising a first storage step of carrying out a rendering process on the received secure print job, and storing image data in a storage area on a storage device, a first transition step of causing the secure print job to make a transition to a state of waiting for authentication in which it is possible to accept an authenticating instruction from a user, a first suspending step of suspending the rendering process when an amount of image data stored in the storage area reaches a full capacity of the storage device during the rendering process in the state of waiting for authentication, a second transition step of, when an authenticating instruction from the user is accepted after the rendering process is suspended, and the authentication is successful, causing the secure print job to make a transition to a successfully-authenticated state, and a second storage step of carrying out a printing process on the image data stored in the storage area, erasing the image data for which the printing process has been completed from the storage area, starting a rendering process on a subsequent page, and storing, in the storage area, image data obtained by converting the subsequent page.

According to the present invention, the problem that printing cannot be performed due to a shortage of a storage area for image data after rendering of a secure print job can be solved, and the wait time from authentication to start of printing can be reduced.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
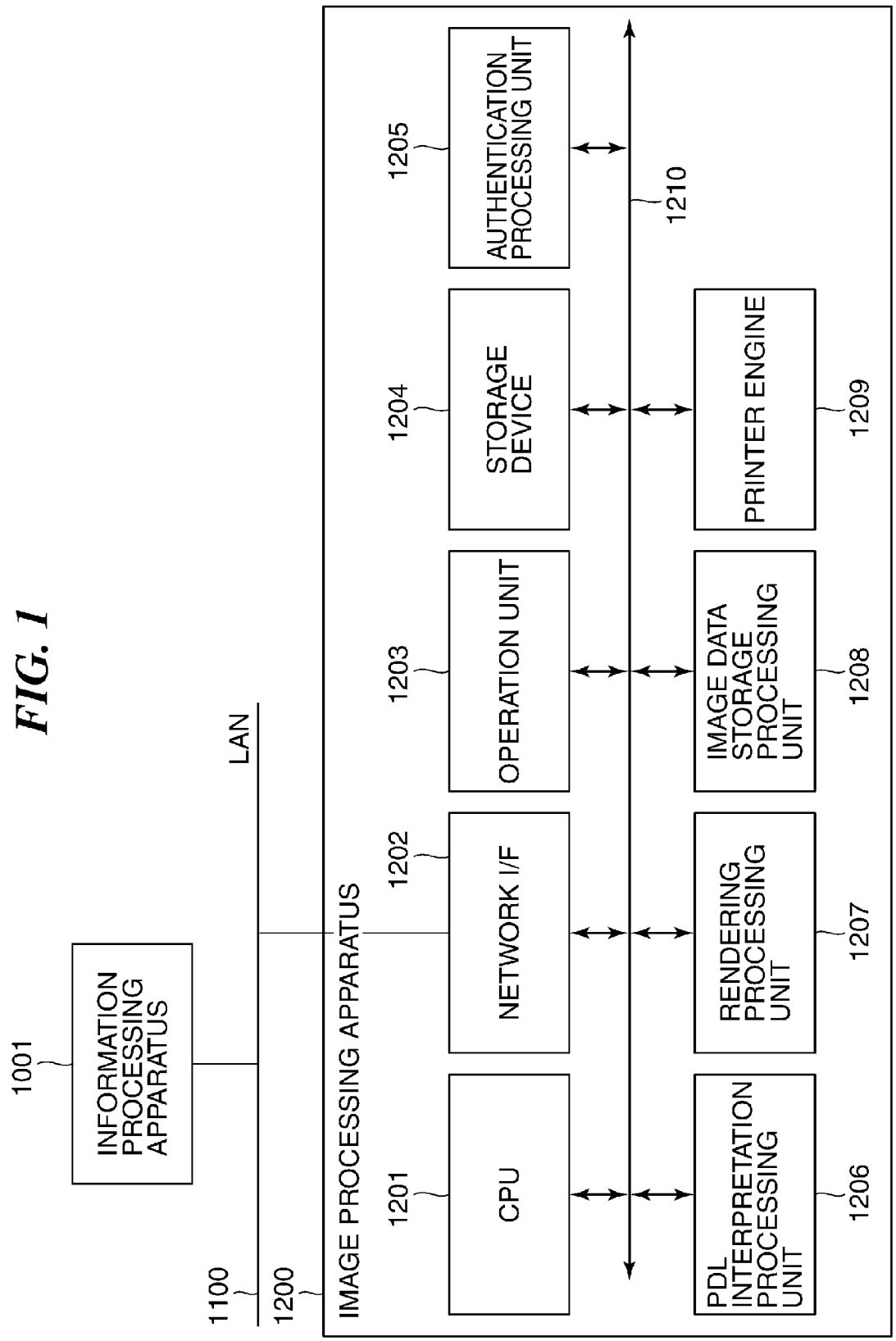
FIG. 1 is a block diagram schematically showing an arrangement of an image processing apparatus according to an embodiment of the present invention.

FIG. 1 is a block diagram schematically showing an arrangement of an image processing apparatus according to an embodiment of the present invention.

The image processing apparatus 1200 is comprised of, for example, a printer, a facsimile, or a multifunctional peripheral, and connected to an information processing apparatus 1001 such as a personal computer via a LAN 1100.

In the image processing apparatus 1200, components described hereafter are connected together via a system bus 1210 as shown in the figure. A CPU 1201 is responsible for controlling the overall image processing apparatus and carrying out image processing. A network I/F 1202 receives secure print jobs and normal print jobs from the information processing apparatus 1001 or the like via the LAN 1100. A secure print job is, for example, a print job created by adding a password or the like, which is set by a user, to PDL data created using software such as a printer driver in the information processing apparatus 1001.

In the image processing apparatus 1200, a received secure print job is temporarily stored in an area reserved in a storage device 1204. Thereafter, a PDL analyzing processing unit 1206 carries out a PDL analyzing process on the secure print job to generate intermediate data (not shown). A rendering processing unit 1207 carries out a drawing process based on the generated intermediate data to generate image data. The generated image data is stored in a storage area reserved in the storage device 1204 on a page-by-page basis by an image data storage processing unit 1208.

When the image processing apparatus 1200 receives a normal print job, image data is generated in the same way as in the above described case of a secure print job, and image data stored in the storage area on the storage device 1204 is output to a printer engine 1209 and subjected to a printing process.

On the other hand, when the image processing apparatus 1200 receives a secure print job, an operation unit 1203 accepts an input of authentication information on a user, and then an authentication processing unit 1205 carries out an authentication process. After the user is successfully authenticated, image data is output to the printer engine 1209 and subjected to a printing process. When the printer engine 1209 completes the printing process, the image data stored in the storage device 1204 is erased.

Figure 2A:
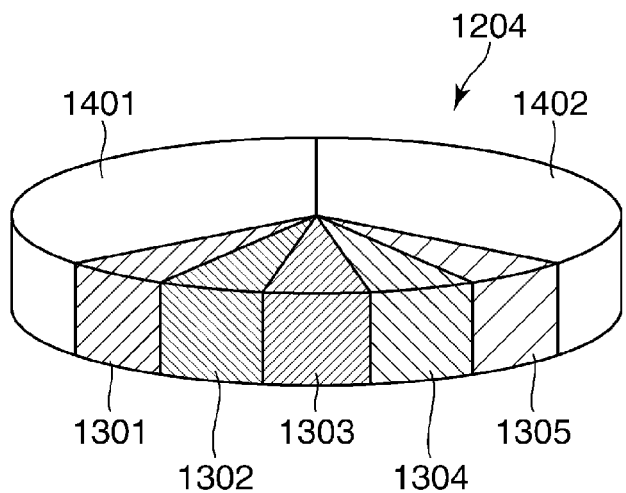
FIG. 2A is a view showing a general outline of a storage area in which image data is stored in a storage device of the image processing apparatus.
Figure 2B:
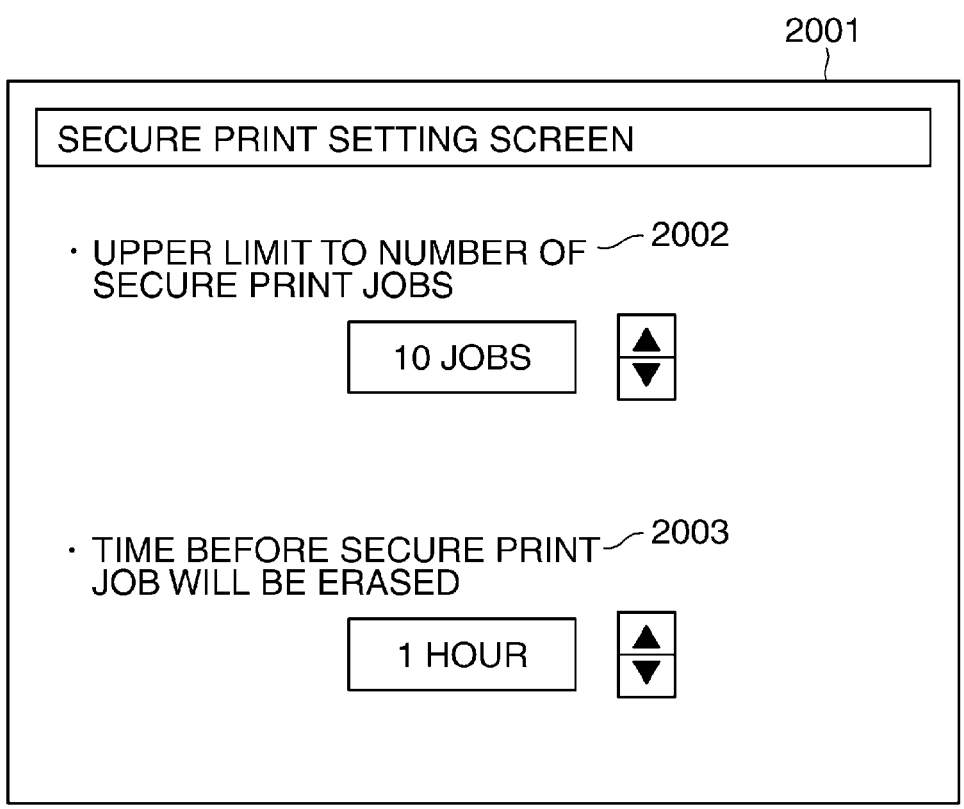
FIG. 2B is a view showing an exemplary secure print setting screen displayed on an operation unit of the image processing apparatus.

FIG. 2A is a view showing a general outline of the storage area in which image data is stored in the storage device 1204 of the image processing apparatus 1200. FIG. 2B is a view showing an exemplary secure print setting screen displayed on the operation unit 1203 of the image processing apparatus 1200.

The storage area in which image data of secure print jobs is stored is divided according to an upper limit 2002 to the number of secure print jobs, which is set on the secure print setting screen 2001 shown in FIG. 2B. For example, when the upper limit 2002 is set to five, the storage area is divided into five areas 1301, 1302, 1303, 1304, and 1305 as shown in FIG.

2A. One of these areas is allocated as a storage area for one secure print job. On the other hand, areas (1401 and 1402) different from the storage area for secure print jobs are allocated for normal print jobs and copy jobs other than secure print jobs.

Referring to FIG. 2B, the secure print setting screen 2001 is displayed on the operation unit 1203, and on the secure pint setting screen 2001, the upper limit 2002 to the number of secure print jobs and an erasing time 2003 can be set. Setting values thereof can be changed by clicking setting keys shown in the figure. In the example shown in the figure, the upper limit 2002 to the number of secure print jobs is set to ten. A setting value of the upper limit 2002 to the number of secure print jobs is equal to the number of areas into which the storage area for secure print jobs is divided.

The erasing time 2003 for a secure print job is a function for deleting the job upon the lapse of a predetermined time period in a case where, for example, the secure print job input to the image processing apparatus 1200 is left as it is without being authenticated.

Setting values of the upper limit 2002 to the number of secure print jobs and the erasing time 2003 are reflected after the image processing apparatus 1200 is restarted. They are erased in a case where a secure print job is stored in the storage device 1204 at the time of restarting.

Figure 3A:
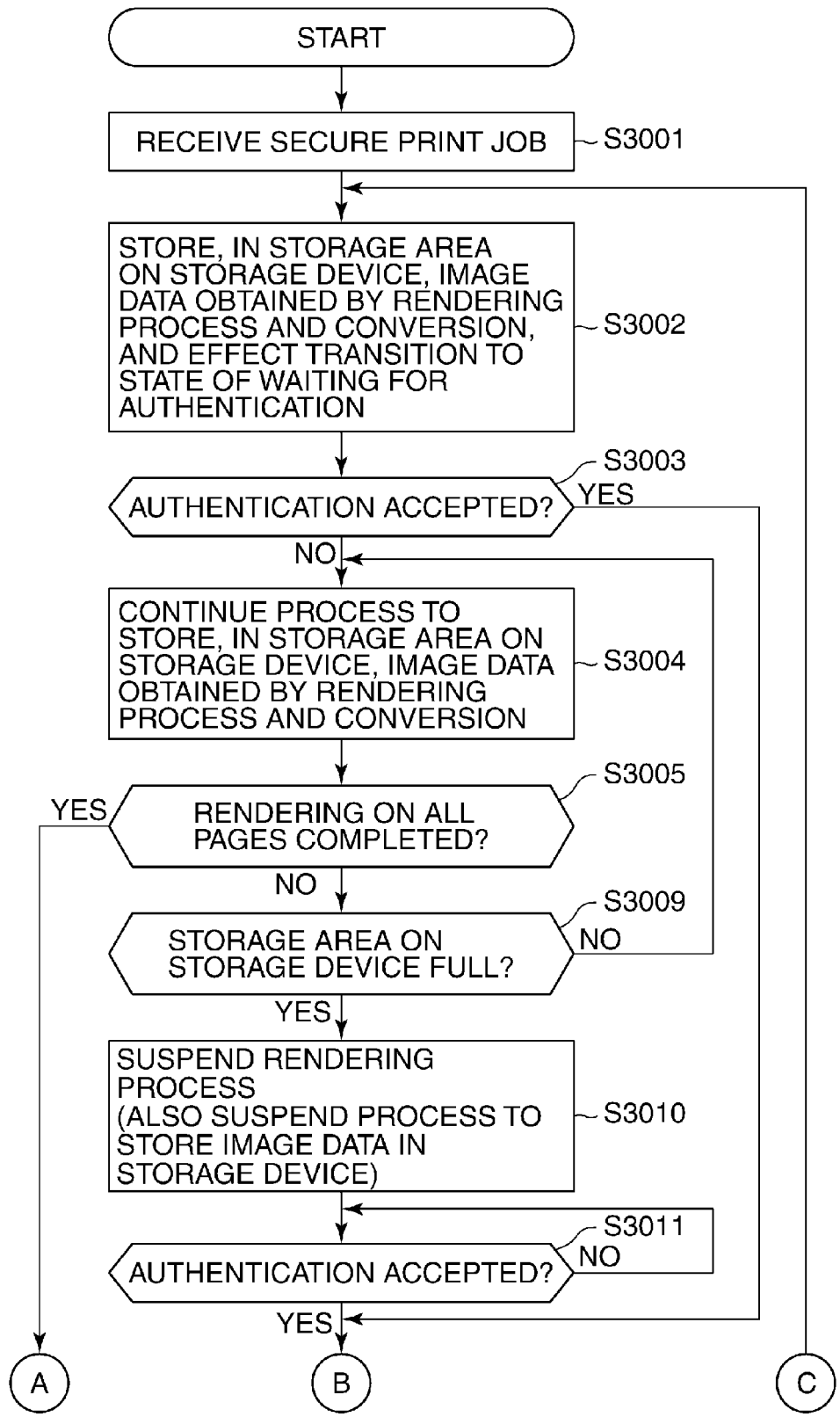
FIGS. 3A and 3B are flowcharts showing the flow of a secure print process carried out by the image processing apparatus.
Figure 3B:
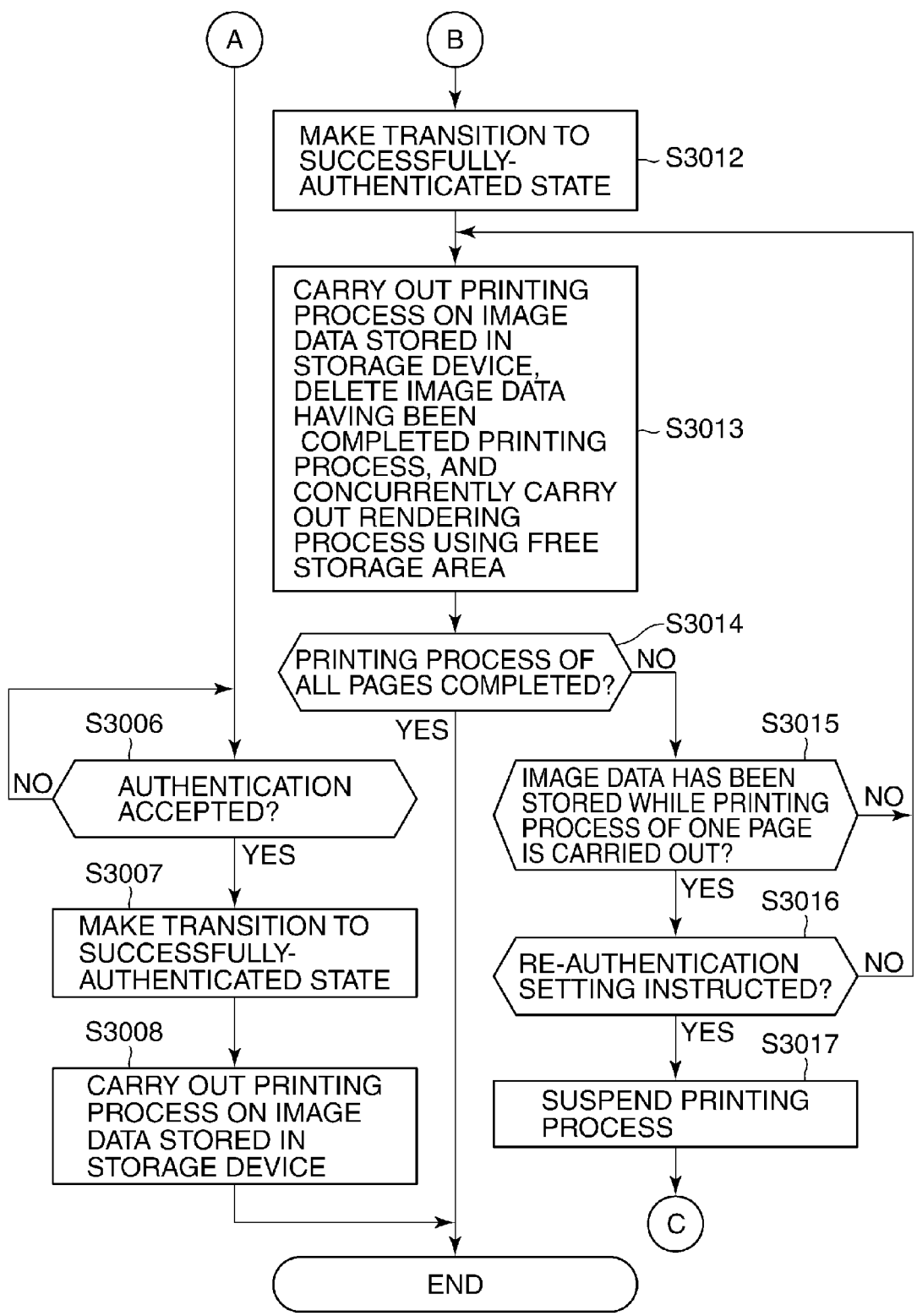

FIGS. 3A and 3B are flowcharts showing the flow of a secure print process carried out by the image processing apparatus 1200. This process is carried out by the CPU 1201 controlling the components shown in FIG. 1.

The CPU 1201 receives a secure print job from the information processing apparatus 1001 connected to the LAN 1100 (step S3001). Then, the CPU 1201 controls the PDL analyzing processing unit 1206 and the rendering processing unit 1207 to carry out a PDL interpretation process and a rendering process on the received secure print job and stores image data in the storage area in the storage device 1204 (step S3002).

Then, the CPU 1201 brings the secure print job into a state of waiting for authentication (step S3002), and continues the rendering process (step S3004) until it accepts an instruction to authenticate a user (step S3003). The state of waiting for authentication means a state in which the image processing apparatus 1200 is ready to accept an authenticating instruction from a user via the operation unit 1203. The authenticating instruction means an input of authentication information such as a password. In states other than the state of waiting for authentication, the CPU 1201 disables acceptance of an instruction to authenticate a user. As will be described later, the CPU 1201 enables depression of a "password" button 5004 when it accepts an instruction to select a secure print job being in the state of waiting for authentication on a job status list screen 5001 (see FIG. 4A) displayed on the operation unit 1203. When the CPU 1201 accepts an instruction to select a job being in any other state, it grays out the "password" button 5004 and disables depression of the "password" button 5004.

First, a description will be given of a case where the image processing apparatus 1200 completes a rendering process for all pages in the storage area on the storage device 1204. This case means a process on a secure print job branched to YES in step S3005.

Upon determining that the rendering process for all pages of the secure print job has been completed (YES in the step S3005), the CPU 1201 maintains the state of waiting for authentication until it accepts an instruction to authenticate the user (step S3006). When the CPU 1201 has accepted an instruction to authenticate the user and successfully authenticated the user (YES in the step S3006), the CPU 1201 brings the secure print job into a successfully-authenticated state (step S3007). Then, the CPU 1201 cause the printer engine 1209 to carry out a printing process on stored image data (step S3008). In this sequential process, because image data of all pages has already been stored in the storage area on the storage device 1204, the image data is output to the printer engine 1209 and subjected to a printing process. Namely, in this case, the CPU 1201 operates in the same way as in the case of secure printing by a conventional image processing apparatus having a high-capacity storage device.

Next, a description will be given of a case where the storage area on the storage device 1204 becomes full before the image processing apparatus 1200 completes the rendering process for all pages. The storage area becoming full means that an area for one job (one block such as the area 1301) on the storage device 1204 used for secure print jobs becomes full. This case means branching to YES in step S3009.

Upon determining that the storage area on the storage device 1204 has become full (YES in the step S3009), the CPU 1201 suspends the rendering process on the secure print job (step S3010). This means that the CPU 1201 also suspends the process in which it stores image data in the storage area on the storage device 1204. The CPU 1201 suspends the process until it accepts an instruction to authenticate the user, and upon receiving the instruction (YES in step S3011), the CPU 1201 brings the secure print job into a successfully-authenticated state (step S3012). Then, the CPU 1201 controls the printer engine 1209 to carry out a printing process on image data that has been stored in the storage device 1204. Then, the CPU 1201 controls the rendering processing unit 1207 to start a rendering process so that the printing process and the rendering process can concurrently be carried out, and upon completion of printing, the CPU 1201 stores image data in a free storage area on the storage device 1204 (step S3013).

Next, a description will now be given of step S3015 in which the concurrent processing is under way before printing of all pages is completed.

When the rendering process is faster than the printing process on the image data, and the number of pieces of image data to be stored in the storage device is greater than the number of sheets on which the image data that has been stored will be printed, what happens is as described hereafter. Namely, image data for the next and subsequent pages is always stored before a printing process on image data for one page is completed and a printing process on image data on the next page is started. Thus, when image data has been stored while the printer engine 1209 has been printing image data of one page (YES in the step S3015), the CPU 1201 continues to concurrently carry out the printing process and the rendering process. In this case, the printing process is never stopped due to an absence of image data in the storage device 1204 during the printing process. For this reason, processing is carried out in the same way as in the case where the image processing apparatus 1200 completes a rendering process for all pages in the storage area on the storage device 1204, and hence the processing on the secure print job can be continued without making the user conscious of the storage area becoming full.

On the other hand, when the rendering process is slower than the printing process on the image data, and the number of pieces of image data to be stored in the storage device 1204 is smaller than the number of sheets on which the image data that has been stored will be printed, what happens is as described hereafter. Namely, image data of the next page may not be subjected to a rendering process and stored in the storage device 1204 before a printing process on image data for all of image data that has already been stored is completed and a printing process on image data on the next page is started. In this case, the interval between sheets becomes long in a printing process carried out by the printer engine 1209.

Figure 5A:
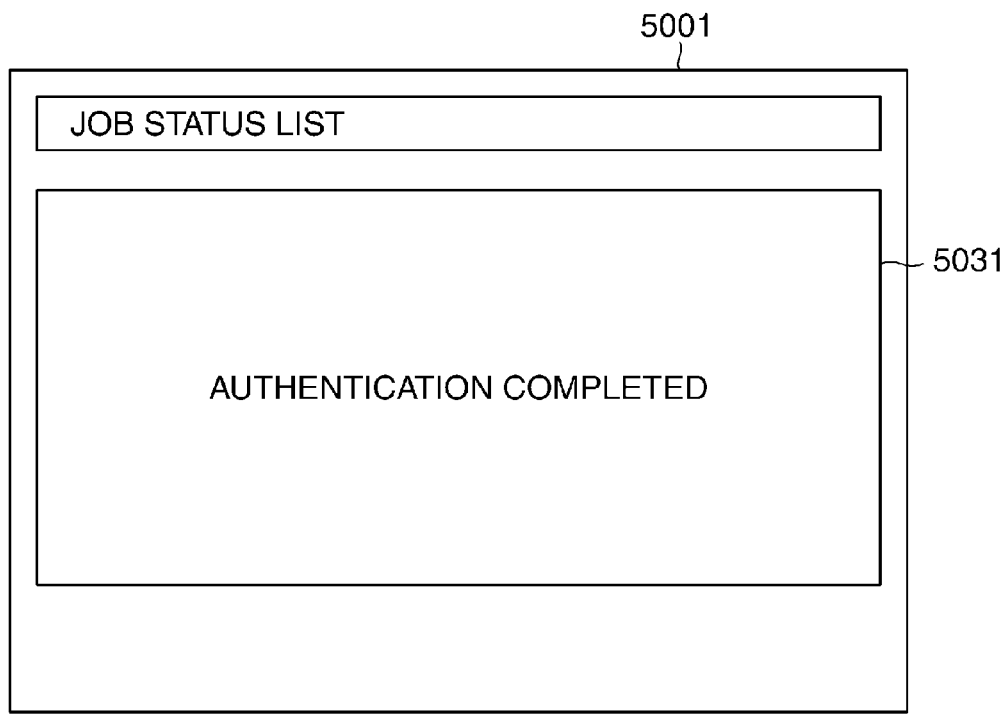
FIG. 5A is a view showing an exemplary authentication completion screen.
Figure 5B:
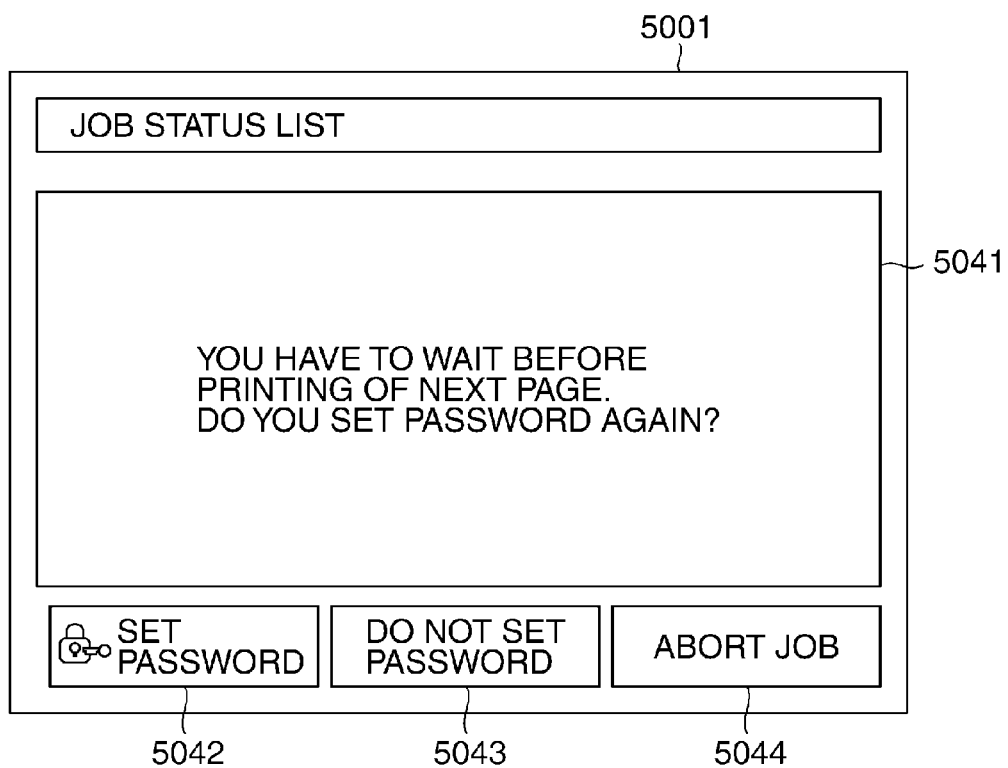
FIG. 5B is a view showing an exemplary password resetting screen.

Accordingly, as shown in FIG. 5B, the CPU displays a password resetting screen 5041 on the job status list screen 5001 displayed on the operation unit 1203. The password resetting screen 5041 shows a message to ask whether or not to set a password again (make a setting to perform authentication again) for a secure print job that has been authenticated using a password because there is a long sheet interval before a printing process on the next page. When resetting a password, the user depresses a "set password" button 5042, and when not setting a password again, the user depresses a "not set password" button 5043. When aborting the job, the user depresses an "abort job" button 5044.

Upon receiving an instruction to set a password again from the user (YES in step S3016), the CPU 1201 temporarily suspends the printing process (step S3017) and returns to the step S3002. At this time, the CPU 1201 brings the secure print job back into the state of waiting for authentication. As a result, when causing the image processing apparatus 1200 to resume printing, the user is required to input a password to the image processing apparatus 1200. The reason why a re-authentication setting is provided is to prevent a third party from viewing an output result in a case where printing of the next page is performed while the user is away from the image processing apparatus 1200 due to a long sheet interval. Also, in a case where the user waits without being away from the image processing apparatus 1200 until printing of the next page is performed, a re-authentication setting do not always have to be made, and thus the user may not be requested to input an unnecessary password, so that flexible responses can be ensured.

Figure 6:
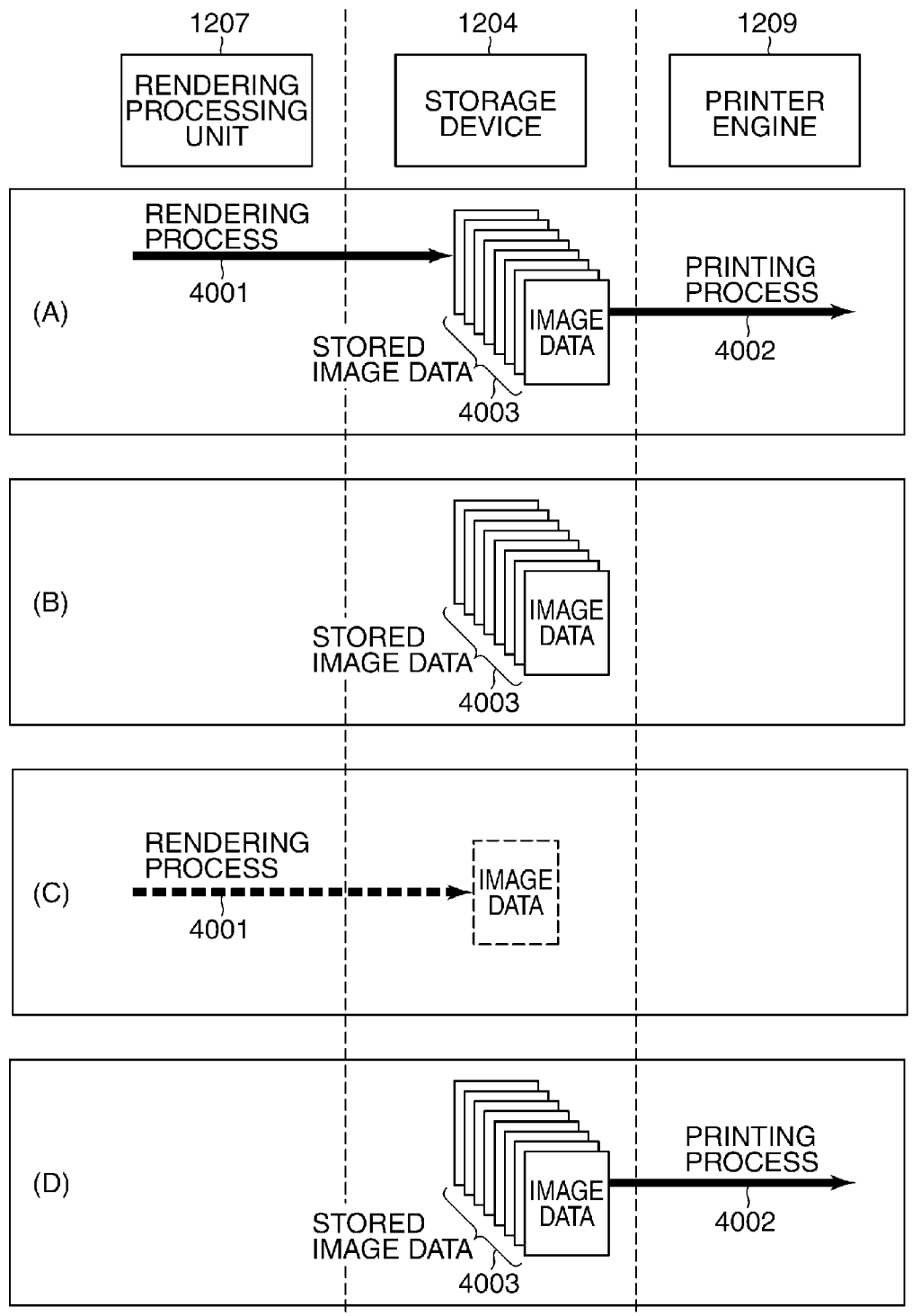
FIG. 6 is a view useful in explaining processes in steps S3014 and S3015 in FIG. 3B.

Referring to FIG. 6, a description will be given of the processes in the steps S3014 and S3015 in FIG. 3B.

In FIG. 6, a rendering process in which image data converted by a rendering process is stored in the storage device 1204 is designated by a reference numeral 4001. A printing process in which the image data stored in the storage device 1204 is output to the printer engine 1209 and subjected to printing is designated by a reference numeral 4002. Further, image data on the storage device 1204 which is generated or erased in these processes is designated by a reference numeral 4003.

When a rendering process for one page is completed, one piece of image data is generated in the storage device 1204, and when a printing process for one page is completed, one piece of image data in the storage device 1204 is erased. For example, assume that the image processing apparatus 1200 has a capability to perform printing at 30 PPM. The image processing apparatus 1200 has only a low-capacity storage device. At 30 PPM, the image processing apparatus 1200 performs printing to output one sheet at intervals of two seconds by the printer engine 1209.

(A) The case of YES in the step S3014:

In the successfully-authenticated state, the CPU 1204 carries out a rendering process for at least one page after the previous page has been subjected to a printing process and before the next page is subjected to a printing process, and when image data has already been stored in the storage device 1204, processing can be performed at short sheet intervals in the printing process 4002.

(B) The case of YES in the step S3008:

In the state of waiting for authentication, the CPU 1204 temporarily suspends the rendering process 4001 because the storage area on the storage device 1204 has become full of the image data 4003. Moreover, due to the state of waiting for authentication, the printing process 4002 is not carried out.

(C) The case of NO in the step S3014:

When image data cannot be stored in the storage device 1204 during rendering (4001) on the next page after the printing process (4002) on the previous page and before the printing process (4002) on the next page, there is a long sheet interval because there is no image data that is subjected to printing. On this occasion, a confirmation screen for asking whether or not to set re-authentication within two seconds after the printing process on the previous page or within three seconds or the like to provide a margin.

(D) A secure print method in the case of the step S3007 or based on the assumption that a conventional HDD is used:

After the rendering process 4001 has been completed, and image data for all pages has been stored, the CPU 1201 accepts an authenticating instruction and carries out only a printing process. This method may be applied even to a case where an image processing apparatus varies print processing speed according to sheet type or in response to high-resolution processing. For example, this method can applied even to a case where in a 30 PPM image processing apparatus has to decrease the speed for print processing for thick sheets or special sheets with high basis weight to a half speed, i.e., 15 PPM.

FIGS. 4A, 4B, 5A, and 5B are views showing exemplary screen layouts of the job status list screen 5001.

The CPU 1201 displays the job status list screen 5001 on the operation unit 1203 to display a list of jobs, accepts an instruction to select a job on the list, and accepts an authenticating instruction.

First, a description will be given of a layout of the job status list screen 5001.

Figure 4A:
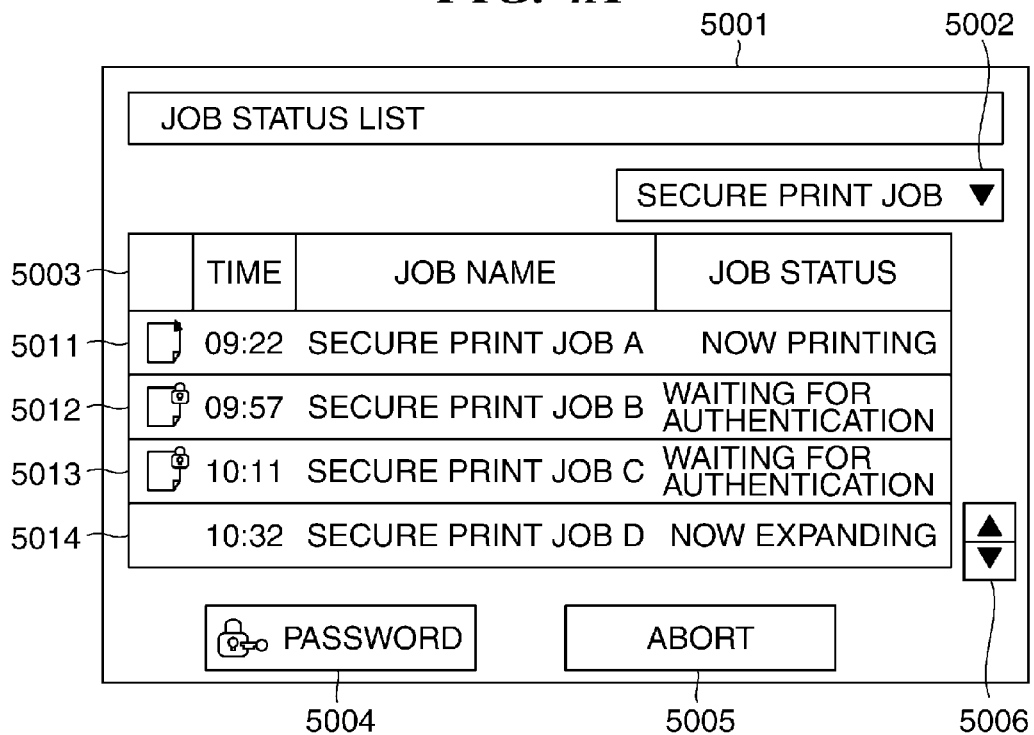
FIG. 4A is a view showing an exemplary screen layout of a job status list.

Referring to FIG. 4A, on the job status list screen 5001, whether to display a list of only secure print jobs or display a list of all other jobs including a copy job or the like can be selected using a pull-down menu 5002. A job list 5003 of jobs currently being processed by the image processing apparatus 1200 is displayed below the pull-down menu 5002. Job list items include icon, time, job name, job status, and so on. When any of a plurality of jobs (for example, a job A 5001, a job B 5012, a job C 5013, and a Job D 5014) on the job list 5003 is depressed, the CPU 1201 accepts an instruction to select the job. The CPU 1201 changes background color for the selected job and notifies the user that the instruction to select the job has been accepted. In the example shown in the figure, four jobs are displayed in the job list 5003, but when all jobs cannot be displayed, other jobs may be displayed by depressing a page turn/back button 5006. Depressing a "cancel" button 5005 after a job is selected cancels processing on the job.

When the CPU 1201 is carrying out a rendering process on a secure print job, a message "now converting" is displayed as a job status in the job list 5003 (5014). As with the step S3002 in FIG. 3A, when the CPU 1201 brings a secure print job into a state of waiting for authentication, a message "waiting for authentication" is displayed as a job status in the job list 5003 (5012 and 5013). Further, when a selected job has successfully been authenticated, the CPU 1201 causes the printer engine 1209 to start a printing process and displays a message "now printing" as a job status in the job list 5003 (5011). It should be noted that upon accepting an instruction to abort a selected job, the CPU 1201 displays a message "now aborting" as a job status in the job list 5003 (not shown). When an aborting process has been completed, the CPU 1201 erases the job from the job status list.

Figure 4B:
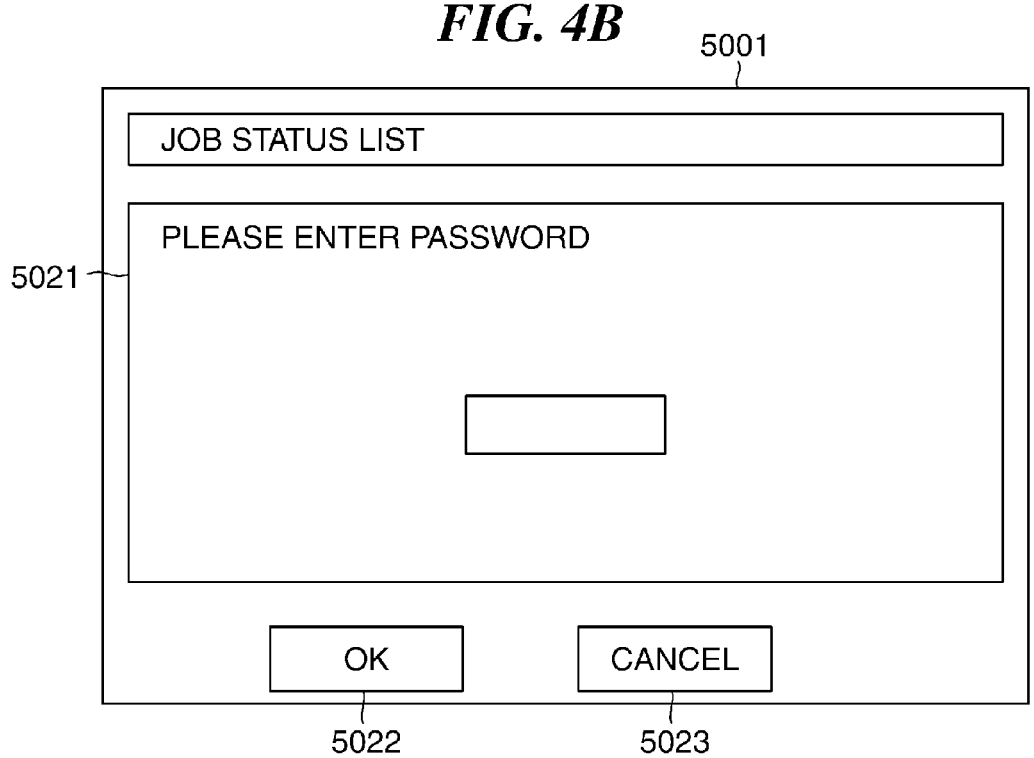
FIG. 4B is a view showing an exemplary password input screen.

When, for example, the CPU 1201 has accepted a selection of one of the job B 5012 and the job C 5013 that are waiting for authentication on the job list 5003, and a "password"

button 5004 has been depressed, the CPU 1201 displays a password input screen 5021 shown in FIG. 4B. When an "OK" button 5022 is depressed after an input of a password is accepted via the password input screen 5021, the authentication processing unit 1205 carries out an authentication process. When authentication is successful, the CPU 1201 displays an authentication completion screen 5031 shown in FIG. 5A. When a "cancel" button 5023 is depressed, the authentication process is not carried out.

When authentication is successful, the CPU 1201 brings the job status list screen 5001 back to the layout shown in FIG. 4A, changes a job status of the job that has successfully been authenticated to "now printing", and continues a rendering process and a printing process. On the other hand, when authentication is not successful, the CPU 1201 brings the job status list screen 5001 back to the layout shown in FIG. 4A, keeps a job status of the job that has not successfully been authenticated "waiting for authentication", and continues a rendering process.

When a storage area becomes full during the rendering process, the CPU 1201 suspends the rendering process (the step S3009 in FIG. 3A), but keeps the message "waiting for authentication" displayed as a job status on the job list screen 5003. Moreover, when a printing process is started after an instruction to authenticate a job for which a storage area has become full is accepted, the CPU 1201 keeps the message "now printing" displayed as a job status on the job list 5003. As a result, secure print job processing can be continued without making the user conscious of a storage area becoming full.

When there is a long sheet interval during a printing process, the CPU 1201 displays the password resetting screen 5041 shown in FIG. 5B (step S3015). Upon accepting a depression of the "set password" button 5042, the CPU 1201 sets again a password set for the secure print job. At this time, a selection screen for setting another password may be provided so that a setting of another password can be accepted. On this occasion, only when not a password set first but a password set again is input, authentication is successful. Upon accepting a depression of the "set no password" button 5043, the CPU 1201 brings the job status list screen 5001 back to the layout shown in FIG. 4A.

According to the present embodiment, when a storage area set on the storage device 1204 becomes full of image data during a rendering process in a state of waiting for authentication, the rendering process is temporarily suspended, and after authentication is successful, a secure print job is brought into a successfully-authenticated state. Image data that has already been stored in the storage device 1204 is subjected to a printing process by the printer engine 1209, and image data for which a printing process has been completed is erased from the storage device 1204, and at the same time, image data obtained by carrying out a rendering process on the subsequent page and converting the same is stored in the storage device 1204. When the rendering process is faster than the printing process on the image data, and the printer engine 1209 has already stored image data in the storage device 1204 while the printer engine 1209 has printed image data for one page, the printing process and the rendering process are continuously carried out at the same time until printing is completed. This can solve the problem that printing cannot be performed due to a shortage of a storage area for image data after rendering on a secure print job, and can reduce the wait time from authentication to start of printing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-230597 filed Oct. 20, 2011, which is hereby incorporated by reference herein in its entirety.

What is claimed is:

1. An image processing apparatus that receives a secure print job and carries out a printing process, comprising:
    a first storage unit configured to carry out a rendering process on the received secure print job, and store image data in a storage area;
    a first transition unit configured to cause the secure print job to make a transition to a state of waiting for authentication in which it is possible to accept an authenticating instruction from a user;
    a first suspending unit configured to suspend the rendering process when an amount of image data stored in the storage area reaches a full capacity of the storage device during the rendering process in the state of waiting for authentication;
    a second transition unit configured to, when an authenticating instruction from the user is accepted after the rendering process is suspended, and the authentication is successful, cause the secure print job to make a transition to a successfully-authenticated state;
    a second storage unit configured to carry out a printing process on the image data stored in the storage area, erase the image data for which the printing process has been completed from the storage area, start a rendering process on a subsequent page, and store, in the storage area, image data obtained by converting the subsequent page;
    an accepting unit configured to, when the rendering process on the subsequent page is slower than the printing process on the image data stored in the storage area, and image data obtained by converting the subsequent page cannot be stored in the storage area while image data of one page is being printed, notify the user that there is a long interval between sheets processed in the printing process and accept an instruction to set re-authentication;
    a second suspending unit configured to suspend the printing process when the instruction to set re-authentication has been accepted;
    a third storage unit configured to, when the instruction to set re-authentication has been accepted, cause the secure print job to make a transition to the state of waiting for authentication, resume the rendering process on the subsequent page, and continue the process to store, in the storage area, the image data obtained by converting the subsequent page; and
    a control unit configured to, when the rendering process on the subsequent page is faster than the printing process on the image data stored in the storage area, and image data obtained by converting the subsequent page is stored in the storage area while image data of one page is printed, concurrently carry out the rendering process on the subsequent page and the printing process until printing is completed, wherein, when the instruction to set re-authentication has not been accepted, said control unit maintains the secure print job in the successfully-authenticated state, carries out a rendering process on the secure print job, and continues the process to store, in the storage area on the storage device, image data obtained by carrying out the rendering process on the secure print job and converting the same.

2. An image processing apparatus according to claim 1, further comprising:
a dividing unit configured to divide the storage area into areas corresponding in number to an upper limit to the number of secure print jobs; and
a setting unit configured to set the upper limit.

3. A control method for an image processing apparatus that receives a secure print job and carries out a printing process, comprising:
a first storage step of carrying out a rendering process on the received secure print job, and storing image data in a storage area on a storage device;
a first transition step of causing the secure print job to make a transition to a state of waiting for authentication in which it is possible to accept an authenticating instruction from a user;
a first suspending step of suspending the rendering process when an amount of image data stored in the storage area reaches a full capacity of the storage device during the rendering process in the state of waiting for authentication;
a second transition step of, when an authenticating instruction from the user is accepted after the rendering process is suspended, and the authentication is successful, causing the secure print job to make a transition to a successfully-authenticated state;
a second storage step of carrying out a printing process on the image data stored in the storage area, erasing the image data for which the printing process has been completed from the storage area, starting a rendering process on a subsequent page, and storing, in the storage area, image data obtained by converting the subsequent page;
an accepting step, when the rendering process on the subsequent page is slower than the printing process on the image data stored in the storage area, and image data obtained by converting the subsequent page cannot be stored in the storage area while image data of one page is being printed, notifying the user that there is a long interval between sheets processed in the printing process and accept an instruction to set re-authentication;
a second suspending step of suspending the printing process when the instruction to set re-authentication has been accepted;
a third storage step, when the instruction to set re-authentication has been accepted, causing the secure print job to make a transition to the state of waiting for authentication, resume the rendering process on the subsequent page, and continuing the process to store, in the storage area, the image data obtained by converting the subsequent page;
a first control step of, when the rendering process on the subsequent page is faster than the printing process on the image data stored in the storage area, and image data obtained by converting the subsequent page is stored in the storage area while image data of one page is printed, concurrently carry out the rendering process on the subsequent page and the printing process until printing is completed; and a second control step of, when the instruction to set re-authentication has not been accepted, the secure print job in the successfully-authenticated state, carrying out a rendering process on the secure print job, and continues the process to store, in the storage area on the storage device, image data obtained by carrying out the rendering process on the secure print job and converting the same.

4. A non-transitory computer-readable storage medium storing a program for implementing a control method of controlling an image processing apparatus that receives a secure print job and carries out a printing process, the control method comprising:
a first storage step of carrying out a rendering process on the received secure print job, and storing image data in a storage area on a storage device;
a first transition step of causing the secure print job to make a transition to a state of waiting for authentication in which it is possible to accept an authenticating instruction from a user;
a first suspending step of suspending the rendering process when an amount of image data stored in the storage area reaches a full capacity of the storage device during the rendering process in the state of waiting for authentication;
a second transition step of, when an authenticating instruction from the user is accepted after the rendering process is suspended, and the authentication is successful, causing the secure print job to make a transition to a successfully-authenticated state;
a second storage step of carrying out a printing process on the image data stored in the storage area, erasing the image data for which the printing process has been completed from the storage area, starting a rendering process on a subsequent page, and storing, in the storage area, image data obtained by converting the subsequent page;
an accepting step, when the rendering process on the subsequent page is slower than the printing process on the image data stored in the storage area, and image data obtained by converting the subsequent page cannot be stored in the storage area while image data of one page is being printed, notifying the user that there is a long interval between sheets processed in the printing process and accept an instruction to set re-authentication;
a second suspending step of suspending the printing process when the instruction to set re-authentication has been accepted;
a third storage step, when the instruction to set re-authentication has been accepted, causing the secure print job to make a transition to the state of waiting for authentication, resume the rendering process on the subsequent page, and continuing the process to store, in the storage area, the image data obtained by converting the subsequent page;
a first control step of, when the rendering process on the subsequent page is faster than the printing process on the image data stored in the storage area, and image data obtained by converting the subsequent page is stored in the storage area while image data of one page is printed, concurrently carry out the rendering process on the subsequent page and the printing process until printing is completed; and a second control step of, when the instruction to set re-authentication has not been accepted, the secure print job in the successfully-authenticated state, carrying out a rendering process on the secure print job, and continues the process to store, in the storage area on the storage device, image data obtained by carrying out the rendering process on the secure print job and converting the same.

5. An image processing apparatus that receives a secure print job and carries out a printing process, comprising:
a storage device;
a rendering processing unit configured to carry out a rendering process on the received secure print job, thereby generating image data;
an image data storage processing unit configured to store the image data in a storage area of the storage device; and
a central processing unit configured to:
cause the secure print job to make a transition to a state of waiting for authentication in which it is possible to accept an authenticating instruction from a user;
suspend the rendering process when an amount of image data stored in the storage area reaches a full capacity of the storage area during the rendering process in the state of waiting for authentication;
cause, when an authenticating instruction from the user is accepted after the rendering process is suspended, and the authentication is successful, the secure print job to make a transition to a successfully-authenticated state;
carry out a printing process on the image data stored in the storage area, erase the image data for which the printing process has been completed from the storage area, start a rendering process on a subsequent page, and store, in the storage area, image data obtained by converting the subsequent page;
notify, when the rendering process on the subsequent page is slower than the printing process on the image data stored in the storage area, and image data obtained by converting the subsequent page cannot be stored in the storage area while image data of one page is being printed, the user that there is a long interval between sheets processed in the printing process and accept an instruction to set re-authentication;
suspend the printing process when the instruction to set re-authentication has been accepted;
cause, when the instruction to set re-authentication has been accepted, the secure print job to make a transition to the state of waiting for authentication, resume the rendering process on the subsequent page, and continue the process to store, in the storage area, the image data obtained by converting the subsequent page; and
when the rendering process on the subsequent page is faster than the printing process on the image data stored in the storage area, and image data obtained by converting the subsequent page is stored in the storage area while image data of one page is printed, concurrently carry out the rendering process on the subsequent page and the printing process until printing is completed,
wherein, when the instruction to set re-authentication has not been accepted, said central processing unit maintains the secure print job in the successfully-authenticated state, carries out a rendering process on the secure print job, and continues the process to store, in the storage area on the storage device, image data obtained by carrying out the rendering process on the secure print job and converting the same.

6. An image processing apparatus according to claim 5, wherein the storage device is divided into areas corresponding in number to an upper limit to the number of secure print jobs.

7. A control method for an image processing apparatus that receives a secure print job and carries out a printing process, comprising:
carrying out a rendering process on the received secure print job, and storing image data in a storage area on a storage device;
causing the secure print job to make a transition to a state of waiting for authentication in which it is possible to accept an authenticating instruction from a user;
suspending the rendering process when an amount of image data stored in the storage area reaches a full capacity of the storage area during the rendering process in the state of waiting for authentication;
causing, when an authenticating instruction from the user is accepted after the rendering process is suspended, and the authentication is successful, the secure print job to make a transition to a successfully-authenticated state;
carrying out a printing process on the image data stored in the storage area, erasing the image data for which the printing process has been completed from the storage area, starting a rendering process on a subsequent page, and storing, in the storage area, image data obtained by converting the subsequent page;
notifying, when the rendering process on the subsequent page is slower than the printing process on the image data stored in the storage area, and image data obtained by converting the subsequent page cannot be stored in the storage area while image data of one page is being printed, the user that there is a long interval between sheets processed in the printing process and accept an instruction to set re-authentication;
suspending the printing process when the instruction to set re-authentication has been accepted;
causing, when the instruction to set re-authentication has been accepted, the secure print job to make a transition to the state of waiting for authentication, resuming the rendering process on the subsequent page, and continuing the process to store, in the storage area, the image data obtained by converting the subsequent page; and
when the rendering process on the subsequent page is faster than the printing process on the image data stored in the storage area, and image data obtained by converting the subsequent page is stored in the storage area while image data of one page is printed, concurrently carrying out the rendering process on the subsequent page and the printing process until printing is completed,
wherein, when the instruction to set re-authentication has not been accepted, the secure print job is maintained in the successfully-authenticated state, a rendering process is carried out on the secure print job, and the process to store, in the storage area on the storage device, image data obtained by carrying out the rendering process on the secure print job and converting the same is continued.

8. A non-transitory computer-readable storage medium storing a program for implementing a control method of controlling an image processing apparatus that receives a secure print job and carries out a printing process, the control method comprising:
carrying out a rendering process on the received secure print job, and storing image data in a storage area on a storage device;

causing the secure print job to make a transition to a state of waiting for authentication in which it is possible to accept an authenticating instruction from a user;

suspending the rendering process when an amount of image data stored in the storage area reaches a full capacity of the storage area during the rendering process in the state of waiting for authentication;

causing, when an authenticating instruction from the user is accepted after the rendering process is suspended, and the authentication is successful, the secure print job to make a transition to a successfully-authenticated state;

carrying out a printing process on the image data stored in the storage area, erasing the image data for which the printing process has been completed from the storage area, starting a rendering process on a subsequent page, and storing, in the storage area, image data obtained by converting the subsequent page;

notifying, when the rendering process on the subsequent page is slower than the printing process on the image data stored in the storage area, and image data obtained by converting the subsequent page cannot be stored in the storage area while image data of one page is being printed, the user that there is a long interval between sheets processed in the printing process and accept an instruction to set re-authentication;

suspending the printing process when the instruction to set re-authentication has been accepted;

causing, when the instruction to set re-authentication has been accepted, the secure print job to make a transition to the state of waiting for authentication, resuming the rendering process on the subsequent page, and continuing the process to store, in the storage area, the image data obtained by converting the subsequent page; and when the rendering process on the subsequent page is faster than the printing process on the image data stored in the storage area, and image data obtained by converting the subsequent page is stored in the storage area while image data of one page is printed, concurrently carrying out the rendering process on the subsequent page and the printing process until printing is completed, wherein, when the instruction to set re-authentication has not been accepted, the secure print job is maintained in the successfully-authenticated state, a rendering process is carried out on the secure print job, and the process to store, in the storage area on the storage device, image data obtained by carrying out the rendering process on the secure print job and converting the same is continued.

9. An image processing apparatus that receives a secure print job and carries out a printing process, comprising:

a storage device comprising first storage areas configured to store secure print jobs and at least one second storage area configured to store non-secure print jobs;

a rendering processing unit configured to carry out a rendering process on the received secure print job, thereby generating image data;

an image data storage processing unit configured to store the image data in a third storage area, the third storage area being one of the first storage areas; and a central processing unit configured to:

cause the secure print job to make a transition to a state of waiting for authentication in which it is possible to accept an authenticating instruction from a user;

suspend the rendering process when an amount of image data stored in the third storage area reaches a full capacity of the third storage area during the rendering process in the state of waiting for authentication;

cause, when an authenticating instruction from the user is accepted after the rendering process is suspended, and the authentication is successful, the secure print job to make a transition to a successfully-authenticated state; and carry out a printing process on the image data stored in the third storage area, erase the image data for which the printing process has been completed from the third storage area, start a rendering process on a subsequent page, and store, in one of the first storage areas, image data obtained by converting the subsequent page, wherein the central processing unit is further configured to:

notify, when the rendering process on the subsequent page is slower than the printing process on the image data stored in the third storage area, and image data obtained by converting the subsequent page cannot be stored in one of the first storage areas while image data of one page is being printed, the user that there is a long interval between sheets processed in the printing process and accept an instruction to set re-authentication;

suspend the printing process when the instruction to set re-authentication has been accepted;

cause, when the instruction to set re-authentication has been accepted, the secure print job to make a transition to the state of waiting for authentication, resume the rendering process on the subsequent page, and continue the process to store, in one of the first storage areas, the image data obtained by converting the subsequent page; and when the rendering process on the subsequent page is faster than the printing process on the image data stored in the third storage area, and image data obtained by converting the subsequent page is stored in one of the first storage areas while image data of one page is printed, concurrently carry out the rendering process on the subsequent page and the printing process until printing is completed, wherein, when the instruction to set re-authentication has not been accepted, said central processing unit maintains the secure print job in the successfully-authenticated state, carries out a rendering process on the secure print job, and continues the process to store, in one of the first storage areas on the storage device, image data obtained by carrying out the rendering process on the secure print job and converting the same.

10. An image processing apparatus according to claim 9, wherein the storage device is divided into first storage areas corresponding in number to an upper limit to the number of secure print jobs.

11. A control method for an image processing apparatus that comprises first storage areas configured to store secure print jobs and at least one second storage area configured to store non-secure print jobs, receives a secure print job, and carries out a printing process, the method comprising:

carrying out a rendering process on the received secure print job, thereby generating image data;

storing the image data in a third storage area, the third storage area being one of the first storage areas;

causing the secure print job to make a transition to a state of waiting for authentication in which it is possible to accept an authenticating instruction from a user;

suspending the rendering process when an amount of image data stored in the third storage area reaches a full capacity of the third storage area during the rendering process in the state of waiting for authentication;

causing, when an authenticating instruction from the user is accepted after the rendering process is suspended, and the authentication is successful, the secure print job to make a transition to a successfully-authenticated state;

carrying out a printing process on the image data stored in the third storage area, erasing the image data for which the printing process has been completed from the third storage area, starting a rendering process on a subsequent page, and storing, in one of the first storage areas, image data obtained by converting the subsequent page;

notifying, when the rendering process on the subsequent page is slower than the printing process on the image data stored in the third storage area, and image data obtained by converting the subsequent page cannot be stored in one of the first storage areas while image data of one page is being printed, the user that there is a long interval between sheets processed in the printing process and accepting an instruction to set re-authentication;

suspending the printing process when the instruction to set re-authentication has been accepted;

causing, when the instruction to set re-authentication has been accepted, the secure print job to make a transition to the state of waiting for authentication, resuming the rendering process on the subsequent page, and continuing the process to store, in one of the first storage areas, the image data obtained by converting the subsequent page; and when the rendering process on the subsequent page is faster than the printing process on the image data stored in the third storage area, and image data obtained by converting the subsequent page is stored in one of the first storage areas while image data of one page is printed, concurrently carrying out the rendering process on the subsequent page and the printing process until printing is completed, wherein, when the instruction to set re-authentication has not been accepted, the secure print job is maintained in the successfully-authenticated state, a rendering process is carried out on the secure print job, and the process to store, in one of the first storage areas on the storage device, image data obtained by carrying out the rendering process on the secure print job and converting the same is continued.

12. A non-transitory computer-readable storage medium storing a program for implementing a control method of controlling an image processing apparatus that comprises first storage areas configured to store secure print jobs and at least one second storage area configured to store non-secure print jobs, receives a secure print job, and carries out a printing process, the control method comprising:

carrying out a rendering process on the received secure print job, thereby generating image data;

storing the image data in a third storage area, the third storage area being one of the first storage areas;

causing the secure print job to make a transition to a state of waiting for authentication in which it is possible to accept an authenticating instruction from a user;

suspending the rendering process when an amount of image data stored in the third storage area reaches a full capacity of the third storage area during the rendering process in the state of waiting for authentication;

causing, when an authenticating instruction from the user is accepted after the rendering process is suspended, and the authentication is successful, the secure print job to make a transition to a successfully-authenticated state;

carrying out a printing process on the image data stored in the third storage area, erasing the image data for which the printing process has been completed from the third storage area, starting a rendering process on a subsequent page, and storing, in one of the first storage areas, image data obtained by converting the subsequent page;

notifying, when the rendering process on the subsequent page is slower than the printing process on the image data stored in the third storage area, and image data obtained by converting the subsequent page cannot be stored in one of the first storage areas while image data of one page is being printed, the user that there is a long interval between sheets processed in the printing process and accepting an instruction to set re-authentication;

suspending the printing process when the instruction to set re-authentication has been accepted;

causing, when the instruction to set re-authentication has been accepted, the secure print job to make a transition to the state of waiting for authentication, resuming the rendering process on the subsequent page, and continuing the process to store, in one of the first storage areas, the image data obtained by converting the subsequent page; and when the rendering process on the subsequent page is faster than the printing process on the image data stored in the third storage area, and image data obtained by converting the subsequent page is stored in one of the first storage areas while image data of one page is printed, concurrently carrying out the rendering process on the subsequent page and the printing process until printing is completed, wherein, when the instruction to set re-authentication has not been accepted, the secure print job is maintained in the successfully-authenticated state, a rendering process is carried out on the secure print job, and the process to store, in one of the first storage areas on the storage device, image data obtained by carrying out the rendering process on the secure print job and converting the same is continued.

* * * * *